United States Patent Office 3,477,989
Patented Nov. 11, 1969

3,477,989
COPOLYESTERS OF 2,5-DIHYDROXY-TEREPHTHALIC ACID
Hermann Zorn, Vienna, and Josef Hrach and Winfried Zeschmar, Schaftenau, Austria, assignors to Sandoz A.G. (also known as Sandoz Ltd.), Basel, Switzerland
No Drawing. Filed June 30, 1965, Ser. No. 468,634
Claims priority, application Austria, July 1, 1964, A 5,649/64
Int. Cl. C08g *17/08*
U.S. Cl. 260—47      7 Claims

ABSTRACT OF THE DISCLOSURE

Condensates of (1) aromatic dicarboxylic acid, (2) a glycol, (3) 2,5-dihydroxyterephthalic acid and (4) an aromatic diol are polyesters useful for the preparation of fibers, films and molded goods.

---

The production of copolyesters possessing fiber- or film-forming properties is known. The process comprises condensation of aromatic dicarboxylic acids or mixtures of aromatic dicarboxylic acids, or of the low molecular-weight esters or other polyester-forming derivatives of these acids, with glycols of formula $$HO-(CH_2)_n-OH \quad (I)$$

wherein $n$ represents a number from 2 to 10.

The aromatic dicarboxylic acids which are generally used for the process are terephthalic, isophthalic and naphthalene-2,6-dicarboxylic acid or mixtures of these. It is also known, that 2,5-dihydroxyterephthalic acid, either alone or in conjunction with terephthalic acid, can be reacted with glycols to form linear polyesters. Examples of derivatives of dicarboxylic acids which form polyesters are the halides, in particular the chlorides, and the anhydrides. The low-molecular esters used are of alcohols, preferably monovalent alcohols, whose boiling points are below those of the glycols used. The esters of alcohols having up to 4 C-atoms are preferred.

It has now been found that valuable new copolyesters are obtained when aromatic dicarboxylic acids, e.g. terephthalic, isophthalic or naphthalene - 2,6 - dicarboxylic acid, or their mixtures or their polyester-forming derivatives are condensed with glycols of Formula I, with small amounts of 2,5-dihydroxyterephthalic acid, or of one of its low-molecular esters or another polyester-forming derivative and with diols of the formula

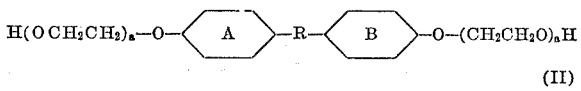

(II)

wherein R represents the direct linkage or a bridge member, $a$ represents a number from 1 to 10, and in which the aromatic nuclei A and B may be substituted.

The 2,5-dihydroxyterephthalic acid or its polyester-forming derivative is employed in amounts of up to 3%, e.g. 0.01–1% or more particularly 0.1–0.5% (by weight), calculated on the amount of aromatic dicarboxylic acid or acids employed. The glycol of Formula I is employed as normal in excess, e.g. in amounts of 2.2–4 moles per 1 mole of the dicarboxylic acid. The aromatic dicarboxylic acids may be employed singly or in mixture with each other. For the synthesis of fiber- and film-forming products, preference is given to terephthalic acid or naphthalene-2,6-dicarboxylic acid alone, or to mixtures of these acids with one another or with other dicarboxylic acids. These mixtures consist preferably of at least 90 mol percent terephthalic or naphthalene-2,6-dicarboxylic acid. In all these cases the polyester-forming derivatives of the acids can be used in place of the acids themselves. Given an appropriate choice of the amounts of the starting products, condensates can be produced for use as plastic molding materials. This type of condensate can be obtained, for example, by the use of selected aromatic dicarboxylic acids or their mixtures, or by changing the amounts of the dihydroxy compounds (II) employed, or by the joint use of these two expedients.

The diols of Formula II are understood to refer primarily to compounds in which the symbol R stands for the direct linkage or for

in which X represents hydrogen or a low-molecular, substituted or unsubstituted alkyl having preferably up to 4 C-atoms. The aromatic nuclei A and B are phenylenes. They may bear any desired substituents; possible substituents of special interest are 1 or 2 alkyl groups having 1 or 2 C-atoms, or 1 to 4 halogen atoms, notably chlorine atoms, in each of the two nuclei.

A specially suitable compound is 2,2-di-[4′-(β-hydroxyethoxy)phenyl]propane, i.e. the bis-phenol A

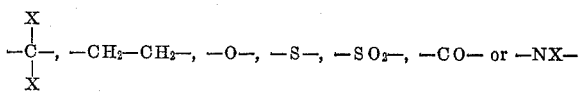

bis-β-hydroxyethylether of the formula

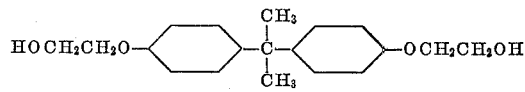

One or more of the aromatic diols of Formula II can be used simultaneously. These compounds are used to advantage in amounts of up to 40 mol percent, or preferably 2–15 mol percent for the production of fiber-forming condensates, these percentages relating to the amount of aromatic dicarboxylic acids employed.

A distinctive feature of the new copolyesters is the small number of cross linkages in the polymer chain, by reason of which the end use properties, especially the mechanical properties, are considerably improved. By modifying the concentration of the 2,5-dihydroxyterephthalic acid or of its ester forming derivative, it is possible to vary the extent of cross-linking in the polymer chain and thereby to suit the properties of the product to the particular end use in view. The new copolyesters have high melting points, very good stability to light, are of pale color and have superior affinity for colorants. The products specially suitable for the production of fibers and films have a lower tenacity value than polyethylene terephthalate, while the elongation values are not higher and can in fact be lower. The tenacity values are of the same order of magnitude as those of the known copolyesters, but the elongation values can be kept equally high or lower, which makes the new copolyesters highly suitable for the production of blend fabrics with cotton. Their higher elasticity and ductibility in relation to the known polyesters and copolyesters is a special advantage for the production of fibers, films and molded goods.

The condensation reaction is generally carried out in the presence of catalysts and, if required, inorganic or organic phosphorus compounds with stabilizing action. Catalysts of special interest for this purpose are the oxides and salts of boric, phosphorous acid, and those of low-molecular aliphatic carboxylic acids having preferably up to 6 C-atoms of manganese, cobalt, zinc, cadmium or lead, for instance manganese tetraborate, cobalt acetate, zinc oxide or lead oxide.

The organic or inorganic phosphorus compounds which, as previously stated, may be added as stabilizers, lighten the self-color of the condensation products and improve their heat stability. The preferred compounds are triphenyl phosphine, tridodecyl phosphine, diphenyl anthracene phosphine, magnesium hypophosphite and disodium phosphate.

The process of this invention can be performed by polycondensation in two stages of, for example, a mixture of terephthalic acid and isophthalic acid or of their low-molecular dialkyl esters with ethylene glycol and up to 40 mol percent bis-phenol-A-di-$\beta$-hydroxy-ethylether and 0.1 to 0.5 weight percent of 2.5-dihydroxyterephthalic acid, calculated on the amount of the dicarboxylic acid mixture employed, in the absence of oxygen and in the presence of catalysts and, if required, of stabilizers of the aforestated type. The first stage is carried out preferably at normal or excess pressure and at temperatures up to 270° C., and the second stage at reduced pressure and at temperatures of 270° to 300° C., or most advantageously at 270–280° C.

The polycondensates thus obtained can be worked up immediately from the melt by the known methods in the form of filament, threads, films, or moldings. A special method of working up the polycondensates is to blend two copolymers of different composition on completion of condensation while still in the melted state and to extrude or mold the blend.

Pigments of any desired type can be added to the melt before the polycondensates are shaped, e.g. carbon black, inorganic or organic colored pigments, optical brightening agents, dulling agents such as titanium dioxide or silicon dioxide, plasticizers, and fibrous or other materials serving to reinforce the final molded product. These products can if desired be added to the mass before or during the condensation reaction.

The following examples illustrate the invention without limiting its scope.

The parts given therein are by weight and the temperatures are in degrees centigrade.

EXAMPLE 1

A mixture of 3,000 parts of terephthalic acid dimethylester, 2,350 parts of ethylene glycol, 450 parts of bis-phenol-A-di-$\beta$-hydroxyethylether and 7.5 parts of 2,5-dihydroxyterephthalic acid dimethylester, 0.4 part of zinc oxide and 0.2 part of triphenyl phosphine is heated with stirring in a nitrogen atmosphere purified of oxygen. Distillation of methanol and ethylene glycol is completed in 3 hours at temperatures up to 252°. Stirring is then continued in vacuum (0.1–1 mm. Hg) and at 274°–276°. After 3½ hours a polycondensate having very good fiber-forming properties is obtained. Similar products are formed when polycondensation is carried out in the presence of lead oxide, cobalt acetate or cadmium acetate as catalyst. Tridodecyl phosphine, disodium phosphate or magnesium hypophosphite can be used as stabilizers in place of triphenyl phosphine.

EXAMPLE 2

A similar product is obtained by condensation in the manner described in Example 1 of a mixture of 3,000 parts of terephthalic acid dimethylester, 150 parts of isophthalic acid dimethylester, 2,350 parts of ethylene glycol, 147 parts of bis-phenol-A-diglycolether, 4,4'-isopropylidenediphenol-diglycolether, and 6 parts of 2,5-dihydroxyterephthalic acid dimethylester in the presence of 2 parts of zinc oxide and 1 part of triphenyl phosphine.

Having thus disclosed the invention that we claim is:

1. A fiber- and film-forming polyester condensate of (1) at least one aromatic dicarboxylic acid selected from the group consisting of terephthalic acid, isophthalic acid and naphthalene - 2,6 - dicarboxylic acid; (2) a glycol, HO—$(CH_2)_n$—OH, wherein $n$ is a number from 2 to 10; (3) from 0.01–3 percent by weight of 2,5-dihydroxyterephthalic acid, based on the weight of (1); and (4) from 2 to 40 mol percent, based on (1), of a diol of the formula

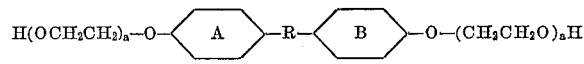

wherein R is either a direct linkage or a member selected from the group consisting of one of the bridging members —$C(X)_2$—, —$CH_2$—$CH_2$—, —O—, —S—, —$SO_2$—, —CO— and —NX—;
X is a member selected from the group consisting of a hydrogen atom and lower alkyl;
each $a$ is a whole number from 1 to 10, inclusive; and
each of A and B is phenylene.

2. A polyester condensate according to claim 1 wherein R is a direct linkage.

3. A polyester condensate according to claim 1 wherein R is —$C(CH_3)_2$—, each of ring A and ring B is paraphenylene, and each $a$ is 1.

4. A polyester condensate according to claim 1 wherein R is one of said bridging members.

5. A polyester condensate according to claim 1 of (1) terephthalic acid, (2) ethylene glycol, (3) 2,5-dihydroxyterephthalic acid and (4) 2,2-di-[4'-($\beta$-hydroxyethoxy) phenol]propane.

6. A polyester condensate according to claim 1 of (1) a mixture comprising at least 90 mol percent of terephthalic acid and at most 10 mol percent of isophthalic acid, (2) ethylene glycol, (3) 2,5-dihydroxyterephthalic acid, and (4) 4,4'-isopropylidenediphenol-diglycolether.

7. A fiber and film forming polyester condensate of (1) at least one dicarboxylic acid selected from the group consisting of terephthalic and isophthalic acid, (2) ethylene glycol, (3) from 0.01 to 3 percent by weight of 2,5-dihydroxyterephthalic acid, based on the weight of (1), and (4) from 2 to 40 mol percent, based on (1) of 2,2-di-[4'-($\beta$-hydroxyethoxy)phenyl]propane.

References Cited

UNITED STATES PATENTS

| | | | |
|---|---|---|---|
| 3,047,536 | 7/1962 | Gordon | 260—47 |
| 3,227,680 | 1/1966 | Tamblyn | 260—47 |

HAROLD D. ANDERSON, Primary Examiner

L. P. QUAST, Assistant Examiner

U.S. Cl. X.R.

260—49, 75

PO-1050
(5/69)

UNITED STATES PATENT OFFICE
CERTIFICATE OF CORRECTION

Patent No. 3,477,989        Dated November 11, 1969

Inventor(s) HERMANN ZORN and JOSEF HRACH

It is certified that error appears in the above-identified patent and that said Letters Patent are hereby corrected as shown below:

Column 2, lines 11 to 14, "-NX-" should read -- -NX-,--; lines 24 to 27, delete the entire formula. Column 3, line 11, "2.5" should read --2,5--. Column 4, lines 1 and 2, "bis-phenol-A-diglycolether, 4,4'-isopropylidenediphenol-diglycolether" should read --2,2-di-[4'-(β-hydroxyethoxy)phenyl]propane; line 37, in the last line of claim 5, "phenol" should read --phenyl--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents